United States Patent
Sheridan et al.

(10) Patent No.: US 10,054,058 B2
(45) Date of Patent: Aug. 21, 2018

(54) GEARED GAS TURBINE ENGINE WITH REDUCED OIL TANK SIZE

(71) Applicants: William G. Sheridan, Southington, CT (US); Michael E. McCune, Colchester, CT (US)

(72) Inventors: William G. Sheridan, Southington, CT (US); Michael E. McCune, Colchester, CT (US)

(73) Assignee: United Technologies Corporation, Farmington, CT (US)

( * ) Notice: Subject to any disclaimer, the term of this patent is extended or adjusted under 35 U.S.C. 154(b) by 578 days.

(21) Appl. No.: 14/595,255

(22) Filed: Jan. 13, 2015

(65) Prior Publication Data
US 2016/0201568 A1    Jul. 14, 2016

(51) Int. Cl.

| F02C 7/36 | (2006.01) |
|---|---|
| F16H 57/04 | (2010.01) |
| F02K 3/06 | (2006.01) |
| F01D 25/20 | (2006.01) |
| F02C 7/06 | (2006.01) |
| F16H 57/08 | (2006.01) |

(52) U.S. Cl.
CPC .............. *F02C 7/36* (2013.01); *F01D 25/20* (2013.01); *F02C 7/06* (2013.01); *F02K 3/06* (2013.01); *F16H 57/0427* (2013.01); *F16H 57/0479* (2013.01); *F16H 57/0486* (2013.01); *F05D 2260/40311* (2013.01); *F16H 57/04* (2013.01); *F16H 57/08* (2013.01); *Y02T 50/671* (2013.01)

(58) Field of Classification Search
None
See application file for complete search history.

(56) References Cited

U.S. PATENT DOCUMENTS

| 3,287,906 | A | 11/1966 | McCormick | |
|---|---|---|---|---|
| 3,612,083 | A * | 10/1971 | Kronk | B64D 41/00 137/202 |
| 3,754,484 | A | 8/1973 | Roberts | |
| 3,892,358 | A | 7/1975 | Gisslen | |
| 4,130,872 | A | 12/1978 | Harloff | |

(Continued)

FOREIGN PATENT DOCUMENTS

| GB | 1516041 | 6/1978 |
|---|---|---|
| GB | 2041090 | 9/1980 |

(Continued)

OTHER PUBLICATIONS

International Preliminary Report on Patentability for International Application No. PCT/US2015/010016 dated Aug. 4, 2016.

(Continued)

*Primary Examiner* — Richard Edgar
*Assistant Examiner* — John S Hunter
(74) *Attorney, Agent, or Firm* — Carlson, Gaskey & Olds, P.C.

(57) ABSTRACT

A gas turbine engine comprises a fan drive turbine for driving a gear reduction, which drives a fan rotor. A lubrication system supplies oil to the gear reduction. An oil tank is relatively small. The lubrication system operates to allow oil to remain in the oil tank for a dwell time of less than or equal to five seconds. A method of designing a gas turbine engine is also disclosed.

26 Claims, 4 Drawing Sheets

(56) References Cited

U.S. PATENT DOCUMENTS

| | | | |
|---|---|---|---|
| 4,899,959 A * | 2/1990 | Weiler | B64C 27/14 |
| | | | 244/53 B |
| 5,107,676 A | 4/1992 | Hadaway et al. | |
| 5,433,674 A | 7/1995 | Sheridan et al. | |
| 5,447,411 A | 9/1995 | Curley et al. | |
| 5,472,383 A | 12/1995 | McKibbin | |
| 5,524,847 A | 6/1996 | Brodell et al. | |
| 5,778,659 A | 7/1998 | Duesler et al. | |
| 5,857,836 A | 1/1999 | Stickler et al. | |
| 5,915,917 A | 6/1999 | Eveker et al. | |
| 5,975,841 A | 11/1999 | Lindemuth et al. | |
| 6,223,616 B1 | 5/2001 | Sheridan | |
| 6,318,070 B1 | 11/2001 | Rey et al. | |
| 6,814,541 B2 | 11/2004 | Evans et al. | |
| 7,021,042 B2 | 4/2006 | Law | |
| 7,591,754 B2 | 9/2009 | Duong et al. | |
| 7,824,305 B2 | 11/2010 | Duong et al. | |
| 7,926,260 B2 | 4/2011 | Sheridan et al. | |
| 8,205,432 B2 | 6/2012 | Sheridan | |
| 8,246,292 B1 * | 8/2012 | Morin | F02C 3/107 |
| | | | 415/1 |
| 8,572,943 B1 | 11/2013 | Sheridan | |
| 2010/0148396 A1 | 6/2010 | Xie et al. | |
| 2010/0331139 A1 | 12/2010 | McCune | |
| 2011/0302903 A1 | 12/2011 | Veilleux, Jr. | |
| 2011/0314830 A1 | 12/2011 | Legare | |
| 2013/0004297 A1 * | 1/2013 | Sheridan | F02C 7/36 |
| | | | 415/122.1 |
| 2013/0318940 A1 | 12/2013 | Parnin et al. | |
| 2014/0140824 A1 | 5/2014 | Sheridan | |

FOREIGN PATENT DOCUMENTS

| | | |
|---|---|---|
| WO | 2007038674 | 4/2007 |
| WO | 2014011245 A2 | 1/2014 |

OTHER PUBLICATIONS

Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida.

Agarwal, B.D and Broutman, L.J. (1990). Analysis and performance of fiber composites, 2nd Edition. John Wiley & Sons, Inc. New York: New York.

Carney, K., Pereira, M. Revilock, and Matheny, P. Jet engine fan blade containment using two alternate geometries. 4th European LS-DYNA Users Conference.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Brennan, P.J. and Kroliczek, E.J. (1979). Heat pipe design handbook. Prepared for National Aeronautics and Space Administration by B & K Engineering, Inc. Jun. 1979.

Horikoshi, S. and Serpone, N. (2013). Introduction to nanoparticles. Microwaves in nanoparticle synthesis. Wiley-VCH Verlag GmbH & Co. KGaA.

Kerrebrock, J.L. (1977). Aircraft engines and gas turbines. Cambridge, MA: The MIT Press.

Xie, M. (2008). Intelligent engine systems: Smart case system. NASA/CR-2008-215233.

Knip, Jr., G. (1987). Analysis of an advanced technology subsonic turbofan incorporating revolutionary materials. NASA Technical Memorandum. May 1987.

Willis, W.S. (1979). Quiet clean short-haul experimental engine (QCSEE) final report. NASA/CR-159473.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press.

Ramsden, J.M. (Ed). (1978). The new European airliner. Flight International, 113(3590). Jan. 7, 1978.

Langston, L. and Faghri, A. Heat pipe turbine vane cooling. Prepared for Advanced Turbine Systems Annual Program Review. Morgantown, West Virginia. Oct. 17-19, 1995.

Oates, G.C. (Ed). (1989). Aircraft propulsion systems and technology and design. Washington, D.C.: American Institute of Aeronautics, Inc.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc.

Pyrograf-III Carbon Nanofiber. Product guide. Retrieved from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc.

Ratna, D. (2009). Handbook of thermoset resins. Shawbury, UK: iSmithers.

Wendus, B.E., Stark, D.F., Holler, R.P., and Funkhouser, M.E. (2003). Follow-on technology requirement study for advanced subsonic transport. NASA/CR-2003-212467.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983.

Dickey, T.A. and Dobak, E.R. (1972). The evolution and development status of ALF 502 turbofan engine. National Aerospace Engineering and Manufacturing Meeting. San Diego, California. Oct. 2-5, 1972.

(56) References Cited

OTHER PUBLICATIONS

Gunston, B. (Ed.) (2000). Jane's aero-engines, Issue seven. Coulsdon, Surrey, UK: Jane's Information Group Limited.

Ivchenko-Progress D-436. Jane's Aero-engines, Aero-engines—Turbofan. Feb. 8, 2012.

Ivchenko-Progress AI-727M. Jane's Aero-engines, Aero-engines—Turbofan. Nov. 27, 2011.

Ivchenko-Progress D-727. Jane's Aero-engines, Aero-engines—Turbofan. Feb. 7, 2007.

Turbomeca Aubisque. Jane's Aero-engines, Aero-engines- Turbofan. Nov. 2, 2009.

Aviadvigatel D-110. Jane's Aero-engines, Aero-engines—Turbofan. Jun. 1, 2010.

Rolls-Royce M45H. Jane's Aero-engines, Aero-engines—Turbofan. Feb. 24, 2010.

Honeywell LF502. Jane's Aero-engines, Aero-engines—Turbofan. Feb. 9, 2012.

Honeywell LF507. Jane's Aero-engines, Aero-engines—Turbofan. Feb. 9, 2012.

Honeywell TFE731. Jane's Aero-engines, Aero-engines—Turbofan. Jul. 18, 2012.

International Search Report and Written Opinion for International Application No. PCT/US2015/010016 dated Oct. 21, 2015.

NASA Conference Publication. Quiet, powered-lift propulsion. Cleveland, Ohio. Nov. 14-15, 1978.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8), p. 32.

Hendricks, E.S. and Tong, M.T. (2012). Performance and weight estimates for an advanced open rotor engine. NASA/TM-2012-217710.

Guynn, M. D., Berton, J.J., Fisher, K. L, Haller, W.J., Tong, M. T., and Thurman, D.R. (2011). Refined exploration of turbofan design options for an advanced single-aisle transport. NASA/TM-2011-216883.

Zalud, T. (1998). Gears put a new spin on turbofan performance. Machine Design, 70(20), p. 104.

Klebanov, Boris, et al. "Power Mechanisms of Rotational and Cyclic Motions," Oil Lubrication, Chapter 18, pp. 191-207, (CRC Press 2016) Copyright 2016 by Taylor & Francis Group, LLC.

Neale, Micahel J. "Lubrication and Reliability Handbook," Design of Oil Tanks, Elsevier Science, 2000. ProQuest Ebook Central, http:ebookcentral.proquest.com/lib/wane/detail.

action?docID=298350. Created from Wayne on Mar. 6, 2018, 07:32:25. Copyright 2000. Elsevier Science.

Supplementary European Search Report for European Application No. 15769798.8 dated Sep. 26, 2017.

\* cited by examiner

GEARED GAS TURBINE ENGINE WITH REDUCED OIL TANK SIZE

CROSS-REFERENCE TO RELATED APPLICATION

This application claims priority to U.S. Provisional Patent Application No. 61/929,174, filed Jan. 20, 2014.

BACKGROUND OF THE INVENTION

This application relates to a gas turbine engine having a gear reduction driving a fan wherein an oil tank is of reduced size.

Gas turbine engines are known and, typically, include a fan delivering air into a bypass duct as propulsion air. The fan also delivers air into a core engine where it passes to a compressor. The air is compressed in the compressor and delivered downstream into a combustion section where it is mixed with fuel and ignited. Products of this combustion pass downstream over turbine rotors driving them to rotate.

Historically, the fan rotor and a fan drive turbine rotor have been driven at the same speed. This placed a restriction on the desirable speed of both the fan and the fan drive turbine.

More recently, it has been proposed to provide a gear reduction between the fan drive turbine and the fan rotor.

The gear reduction is a source of increased heat loss. As an example, a geared turbofan engine creates about twice as much heat loss as a non-geared turbofan engine. In addition, the weight of the engine increases due to the weight of the gear reduction.

It has typically been the case that a designer of a gas turbine engine sizes an oil tank such that the oil can sit in the oil tank long enough to de-aerate. On a normal turbofan engine, this had been approximately at least ten seconds.

SUMMARY OF THE INVENTION

In a featured embodiment, a gas turbine engine comprises a fan drive turbine for driving a gear reduction, which drives a fan rotor. A lubrication system supplies oil to the gear reduction. An oil tank is relatively small. The lubrication system operates to allow oil to remain in the oil tank for a dwell time of less than or equal to five seconds.

In another embodiment according to the previous embodiment, the dwell time is less than or equal to 3.0 seconds.

In another embodiment according to any of the previous embodiments, the gear reduction includes a sun gear for driving intermediate gears. There are oil baffles located circumferentially between the intermediate gears.

In another embodiment according to any of the previous embodiments, an oil capture gutter surrounds the gear reduction.

In another embodiment according to any of the previous embodiments, the fan rotor delivers air into a bypass duct as propulsion air and into a core engine where it passes into a compressor section. A bypass ratio is defined as the ratio of air delivered into the bypass duct compared to the volume of air delivered into the core engine. The bypass ratio is greater than or equal to about 6.0.

In another embodiment according to any of the previous embodiments, the bypass ratio is greater than or equal to about 10.0.

In another embodiment according to any of the previous embodiments, a gear ratio of the gear reduction is greater than or equal to about 2.3:1.

In another embodiment according to any of the previous embodiments, the oil tank may hold greater than or equal to 25 and less than or equal to 35 quarts of oil.

In another embodiment according to any of the previous embodiments, the engine is rated greater than or equal to 15,000 and less than or equal to 35,000 lbs in rated thrust at take-off.

In another embodiment according to any of the previous embodiments, the oil tank holds greater than or equal to 35 and less than or equal to 50 quarts of oil.

In another embodiment according to any of the previous embodiments, the oil tank is associated with an engine having greater than or equal to 35,000 and less than or equal to 100,000 lbs in rated thrust at take-off.

In another embodiment according to any of the previous embodiments, the gear reduction includes a sun gear for driving intermediate gears. There are oil baffles located circumferentially between the intermediate gears.

In another embodiment according to any of the previous embodiments, an oil capture gutter surrounds the gear reduction.

In another embodiment according to any of the previous embodiments, the oil tank may hold greater than or equal to 25 and less than or equal to 35 quarts of oil.

In another embodiment according to any of the previous embodiments, the engine is rated greater than or equal to 15,000 and less than or equal to 35,000 lbs in rated thrust at take-off.

In another embodiment according to any of the previous embodiments, the oil tank holds greater than or equal to 35 and less than or equal to 50 quarts of oil.

In another embodiment according to any of the previous embodiments, the oil tank is associated with an engine having greater than or equal to 35,000 and less than or equal to 100,000 lbs in rated thrust at take-off.

In another embodiment according to any of the previous embodiments, the oil tank may hold greater than or equal to 25 and less than or equal to 35 quarts of oil. The engine is rated greater than or equal to 15,000 and less than or equal to 35,000 lbs in rated thrust at take-off.

In another embodiment according to any of the previous embodiments, the oil tank holds greater than or equal to 35 and less than or equal to 50 quarts of oil. The oil tank is associated with an engine having greater than or equal to 35,000 and less than or equal to 100,000 lbs in rated thrust at take-off.

In another embodiment according to any of the previous embodiments, an oil capture gutter surrounds the gear reduction.

In another featured embodiment, a method of designing a gas turbine engine comprises the steps of providing a fan drive turbine for driving a gear reduction. The gear reduction drives a fan rotor. A lubrication system is provided to supply oil to the gear reduction. An oil tank is relatively small. The lubrication system operates to allow oil to remain in the oil tank for a dwell time of less than or equal to five seconds.

In another embodiment according to the previous embodiment, the dwell time is less than or equal to 3.0 seconds.

In another embodiment according to any of the previous embodiments, the gear reduction includes a sun gear for driving intermediate gears. There are oil baffles located circumferentially between the intermediate gears.

In another embodiment according to any of the previous embodiments, an oil capture gutter around the gear reduction is provided.

In another embodiment according to any of the previous embodiments, the fan rotor delivers air into a bypass duct as propulsion air and into a core engine where it passes into a compressor section. A bypass ratio is defined as the ratio of air delivered into the bypass duct compared to the volume of air delivered into the core engine. The bypass ratio is greater than or equal to about 10.0.

In another embodiment according to any of the previous embodiments, a gear ratio of the gear reduction is greater than or equal to about 2.3:1.

In another embodiment according to any of the previous embodiments, the oil tank may hold greater than or equal to 25 and less than or equal to 35 quarts of oil.

In another embodiment according to any of the previous embodiments, the engine is rated greater than or equal to 15,000 and less than or equal to 35,000 lbs in rated thrust at take-off.

In another embodiment according to any of the previous embodiments, the oil tank holds greater than or equal to 35 and less than or equal to 50 quarts of oil.

In another embodiment according to any of the previous embodiments, the oil tank is associated with an engine having greater than or equal to 35,000 and less than or equal to 100,000 lbs in rated thrust at take-off.

These and other features may be best understood from the following drawings and specification.

DETAILED DESCRIPTION

Figure 1:
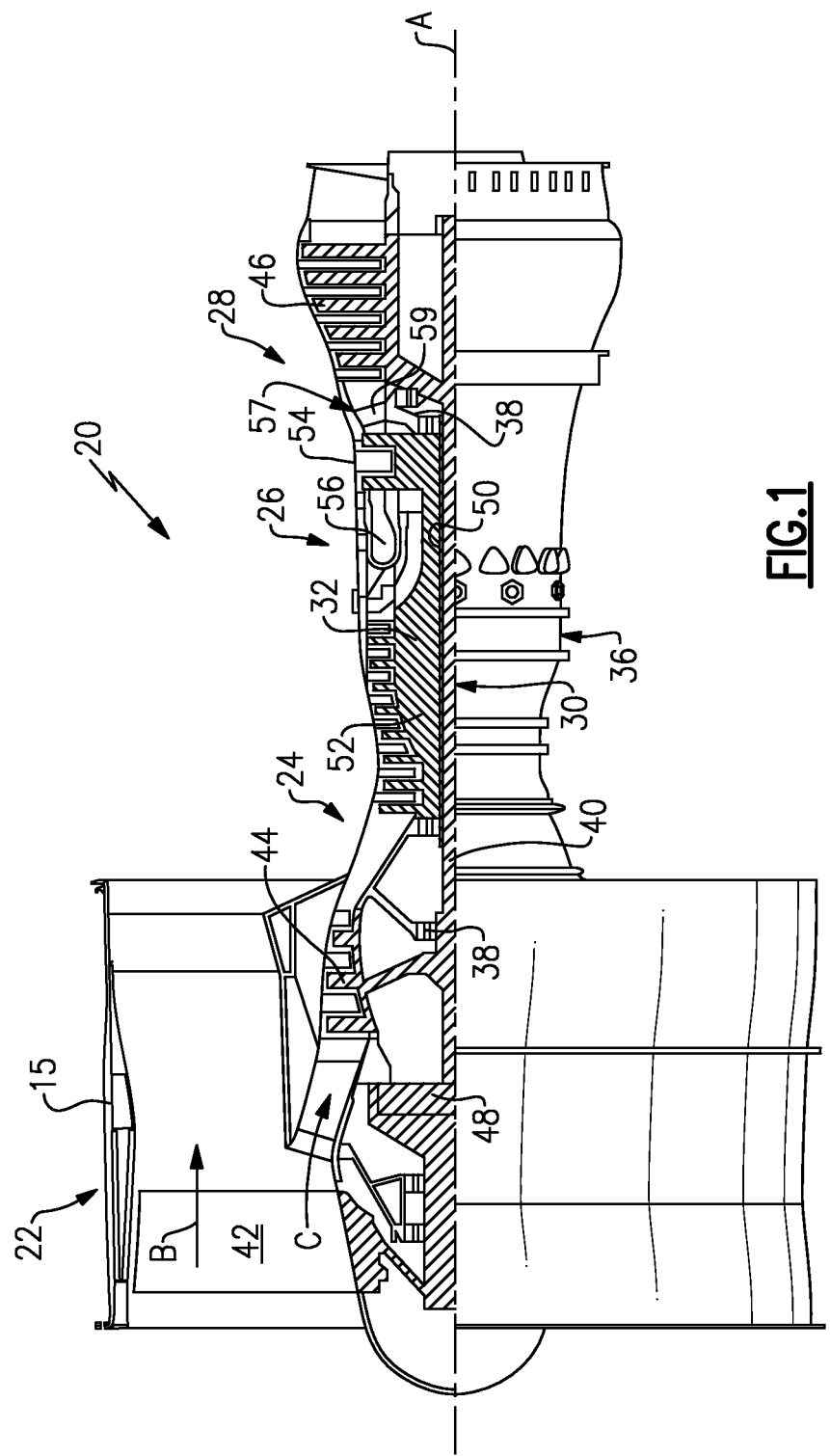
FIG. 1 is a schematic view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than or equal to about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than or equal to about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second.

Figure 2:
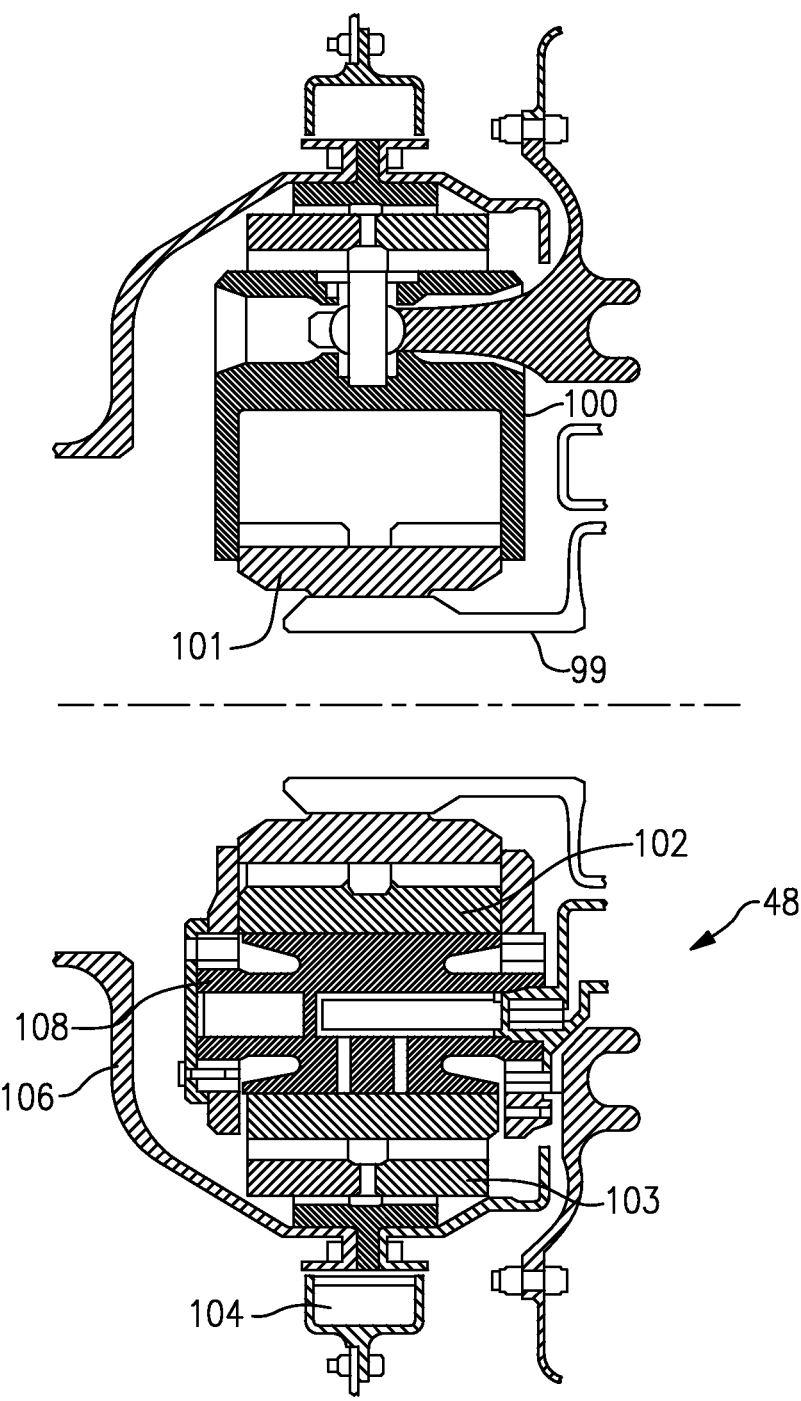
FIG. 2 shows a portion of a gear reduction.

As shown in FIG. 2, a flexible shaft 99, which is driven by the turbine 46, drives a sun gear 101 which, in turn, engages and drives intermediate gears 102. In some embodiments, the intermediate gears 102 may be planet gears of a planetary epicyclic gear system. In other embodiments, the intermediate gears 102 may be star gears of a star epicyclic gear system. The intermediate gears 102 engage and drive a ring gear 103 to, in turn, drive an output shaft 106, which then drives the fan rotor 42. In other embodiments, a planetary gear carrier (not shown) driven by planetary gears may drive the fan shaft. Lubricant is supplied to a journal pin 108, to the intermediate gears 102 and to other locations within the gear reduction 48.

Figure 3:
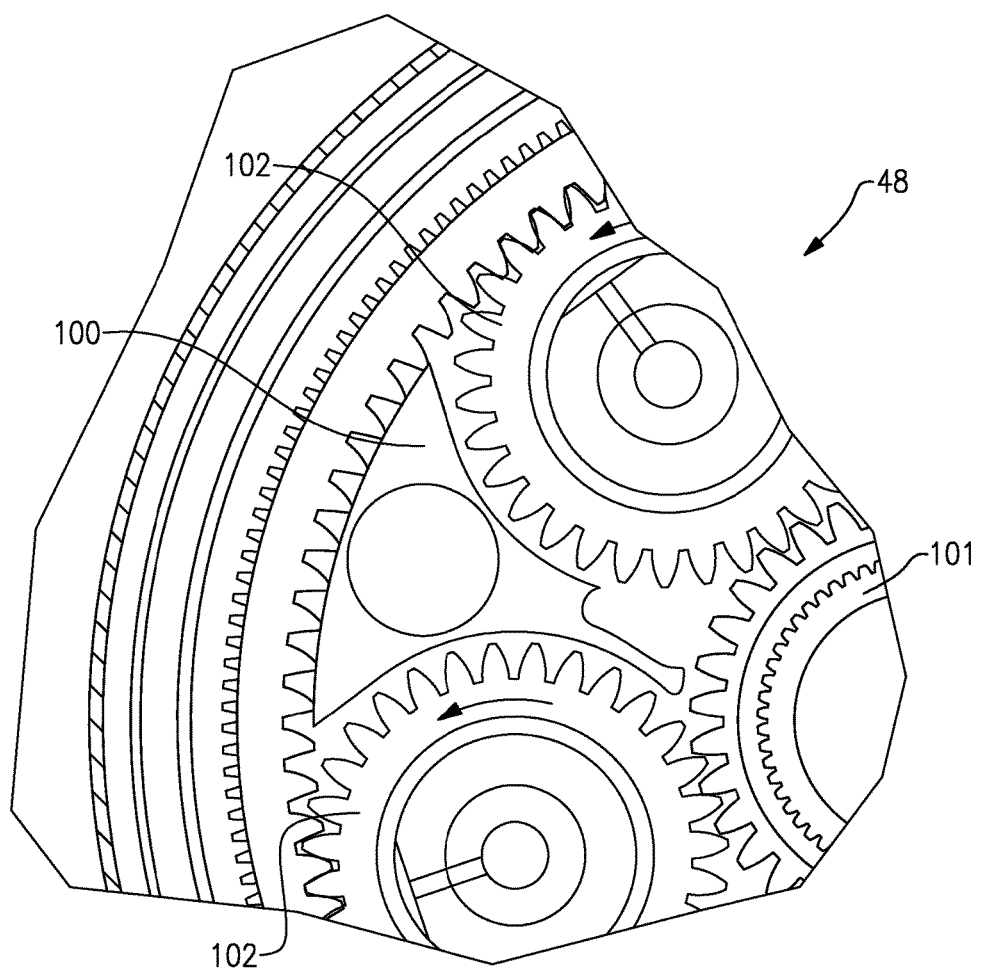
FIG. 3 shows another portion of a gear reduction.

FIG. 3 shows baffles 100 which are placed circumferentially between adjacent planet gears 102.

Figure 4:
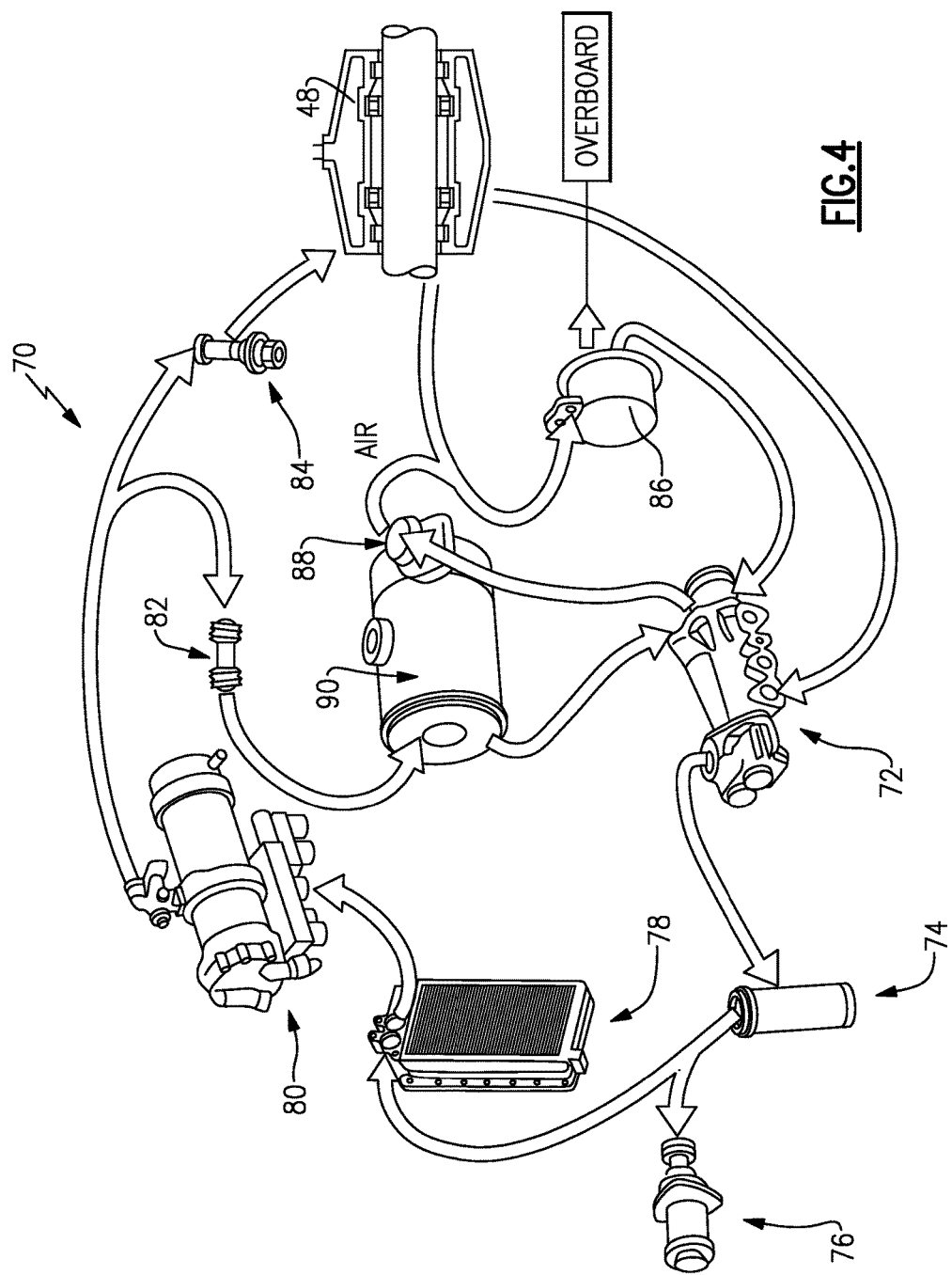
FIG. 4 shows a lubrication system.

A gutter 104 surrounds the gear reduction 48 and captures oil that has left the gear reduction. Oil from the gear reduction 48 is returned to a pump 72 (See FIG. 4) or a tank 90 as shown schematically in FIG. 4. As shown, a lubricant system 70 includes the gear reduction 48 which may be structured as shown in FIGS. 2 and 3. Notably, complete details of the operation of the baffle, the gutter and the other portions of the gear reduction may be as disclosed in U.S. Pat. No. 6,223,616, the disclosure of which with regard to the operation of the gear reduction is incorporated by reference.

Oil flows from an oil pump 72 to a filter 74 through a pressure relief valve 76 to an air/oil cooler 78 and then to a fuel/oil cooler 80. The oil may pass through an oil pressure trim orifice 82 and back to the tank 90. Alternatively, the oil may pass through a strainer 84 and then to the gear reduction 48. Oil returning from the gear reduction and, in particular, from the gutter, may pass back directly to the pump 72 or to the tank 90. This is a simplification of the overall lubricant system and, as appreciated, there may be other components.

Applicant has recognized that by utilizing baffles 100 and a gutter 104 on the gear reduction 48, which may be generally as disclosed in the above-mentioned U.S. Patent, the oil need not sit in the oil tank for ten seconds in order to de-aerate. Thus, the size of the tank 90 may be made much smaller.

Applicant has discovered that oil is de-aerated by the baffles 100 and gutter system and that a dwell time in the oil tank to remove air bubbles may be less than five seconds. More preferably, it may be less than or equal to about 3.0 seconds. This allows the use of oil tank 90 to be of a size roughly equivalent to the size utilized in prior non-geared gas turbine engines.

As an example, an oil tank that holds 25 to 35 quarts of oil may be utilized on a geared gas turbine engine with 15,000 to 35,000 lbs in rated thrust at take-off. Further, an oil tank may be 35 quarts to 50 quarts of oil for an engine with 35,000 to 100,000 lbs in rated thrust at take-off.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising: a fan drive turbine for driving a gear reduction, said gear reduction for driving a fan rotor; and a lubrication system for supplying oil to said gear reduction, with an oil tank and the lubrication system operable for allowing oil to remain in the oil tank for a dwell time of less than or equal to five seconds, and wherein said gear reduction includes a sun gear for driving intermediate gears, and there being oil baffles located circumferentially between said intermediate gears.

2. The gas turbine engine as set forth in claim 1, wherein said dwell time is less than or equal to 3.0 seconds.

3. The gas turbine engine as set forth in claim 2, wherein an oil capture gutter surrounds said gear reduction.

4. The gas turbine engine as set forth in claim 3, wherein said fan rotor delivering air into a bypass duct as propulsion air and into a core engine where it passes into a compressor section, with a bypass ratio defined as the ratio of air delivered into said bypass duct compared to the volume of air delivered into said core engine with said bypass ratio being greater than or equal to 6.0.

5. The gas turbine engine as set forth in claim 4, wherein said bypass ratio is greater than or equal to 10.0.

6. The gas turbine engine as set forth in claim 4, wherein a gear ratio of said gear reduction being greater than or equal to 2.3:1.

7. The gas turbine engine as set forth in claim 3, wherein said oil tank holds greater than or equal to 25 and less than or equal to 35 quarts of oil.

8. The gas turbine engine as set forth in claim 7, wherein said engine is rated greater than or equal to 15,000 and less than or equal to 35,000 lbs in rated thrust at take-off.

9. The gas turbine engine as set forth in claim 3, wherein said oil tank holds greater than or equal to 35 and less than or equal to 50 quarts of oil.

10. The gas turbine engine as set forth in claim 9, wherein said gas turbine engine having greater than or equal to 35,000 and less than or equal to 100,000 lbs in rated thrust at take-off.

11. The gas turbine engine as set forth in claim 1, wherein an oil capture gutter surrounds said gear reduction.

12. The gas turbine engine as set forth in claim 11, wherein said oil tank holds greater than or equal to 25 and less than or equal to 35 quarts of oil.

13. The gas turbine engine as set forth in claim 12, wherein said engine is rated greater than or equal to 15,000 and less than or equal to 35,000 lbs in rated thrust at take-off.

14. The gas turbine engine as set forth in claim 11, wherein said oil tank holds greater than or equal to 35 and less than or equal to 50 quarts of oil.

15. The gas turbine engine as set forth in claim 14, wherein said gas turbine engine having greater than or equal to 35,000 and less than or equal to 100,000 lbs in rated thrust at take-off.

16. The gas turbine engine as set forth in claim 1, wherein said oil tank holds greater than or equal to 25 and less than or equal to 35 quarts of oil, and said gas turbine engine is rated greater than or equal to 15,000 and less than or equal to 35,000 lbs in rated thrust at take-off.

17. The gas turbine engine as set forth in claim 1, wherein said oil tank holds greater than or equal to 35 and less than or equal to 50 quarts of oil, and said gas turbine engine having greater than or equal to 35,000 and less than or equal to 100,000 lbs in rated thrust at take-off.

18. A method of building a gas turbine engine comprising: providing a fan drive turbine for driving a gear reduction, said gear reduction for driving a fan rotor; and providing a lubrication system for supplying oil to said gear reduction, with an oil tank and the lubrication system operable for allowing oil to remain in the oil tank for a dwell time of less than or equal to five seconds, and wherein said clear reduction includes a sun clear for driving intermediate clears, and there being oil baffles located circumferentially between said intermediate clears.

19. The method as set forth in claim 18, wherein said dwell time is less than or equal to 3.0 seconds.

20. The method as set forth in claim 18, comprising:
providing an oil capture gutter around said gear reduction.

21. The method as set forth in claim 18, wherein said fan rotor delivering air into a bypass duct as propulsion air and into a core engine where it passes into a compressor section, with a bypass ratio defined as the ratio of air delivered into said bypass duct compared to the volume of air delivered into said core engine with said bypass ratio being greater than or equal to 10.0.

22. The method as set forth in claim 18, wherein a gear ratio of said gear reduction being greater than or equal to 2.3:1.

23. The method as set forth in claim 18, wherein said oil tank holds greater than or equal to 25 and less than or equal to 35 quarts of oil.

24. The method as set forth in claim 23, wherein said engine is rated greater than or equal to 15,000 and less than or equal to 35,000 lbs in rated thrust at take-off.

25. The method as set forth in claim 18, wherein said oil tank holds greater than or equal to 35 and less than or equal to 50 quarts of oil.

26. The method as set forth in claim 25, wherein said gas turbine engine having greater than or equal to 35,000 and less than or equal to 100,000 lbs in rated thrust at take-off.

* * * * *

UNITED STATES PATENT AND TRADEMARK OFFICE
CERTIFICATE OF CORRECTION

| | | |
|---|---|---|
| PATENT NO. | : 10,054,058 B2 | Page 1 of 1 |
| APPLICATION NO. | : 14/595255 | |
| DATED | : August 21, 2018 | |
| INVENTOR(S) | : Sheridan et al. | |

It is certified that error appears in the above-identified patent and that said Letters Patent is hereby corrected as shown below:

On the Title Page

Please add the following section:
--Related U.S. Application Data:
(63) Provisional application No. 61/929,174, filed on Jan. 20, 2014.--

Signed and Sealed this
Twenty-ninth Day of January, 2019

Andrei Iancu
*Director of the United States Patent and Trademark Office*